Oct. 14, 1969   G. F. GIELOW ET AL   3,472,241
VEHICLE SEAT ASH RECEIVER
Filed Dec. 26, 1967
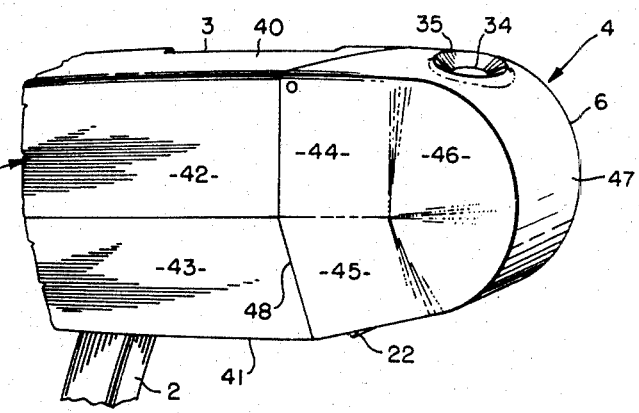
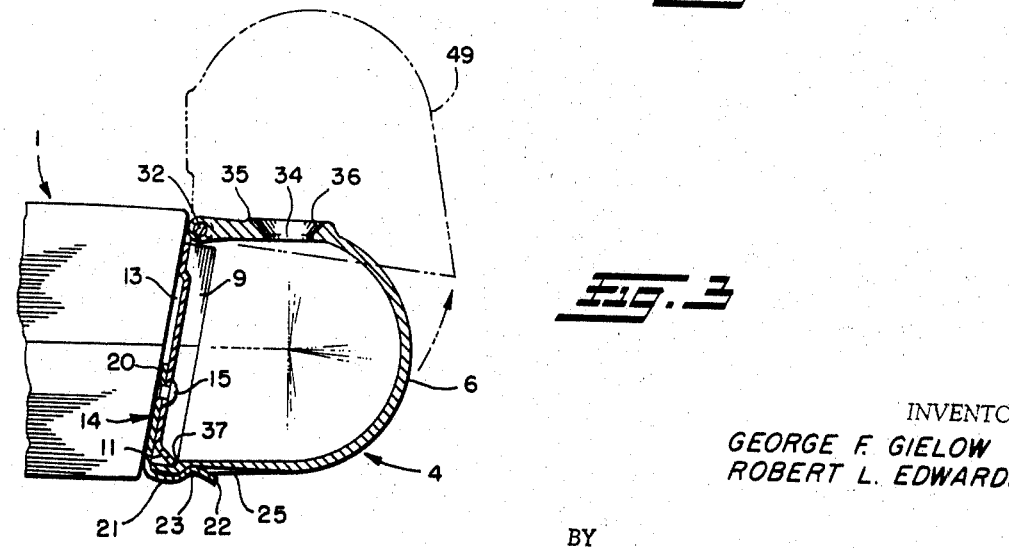
INVENTORS
GEORGE F. GIELOW
ROBERT L. EDWARDS
BY
Oberlin, Maky, Donnelly & Renner
ATTORNEYS United States Patent Office 3,472,241
Patented Oct. 14, 1969

1

3,472,241
VEHICLE SEAT ASH RECEIVER
George F. Gielow and Robert L. Edwards, Mansfield, Ohio, assignors to Artnell Company, Chicago, Ill., a corporation of Delaware
Filed Dec. 26, 1967, Ser. No. 693,506
Int. Cl. A24f 19/14
U.S. Cl. 131—235                               6 Claims

ABSTRACT OF THE DISCLOSURE

A vehicle seat ash receiver which constitutes a terminal continuation of a vehicle seat arm having a mounting hinge plate mounted on the end of the arm, to the upper end of which the ash receiver housing is hingedly connected with a spring member being secured to the hinge plate at the lower end thereof cooperating with the housing and the lower end of the hinge plate releasably to secure the housing in a closed position, such housing being swung upwardly about the hinge at the upper end thereof for emptying of the receiver.

DISCLOSURE

This invention relates generally as indicated to a vehicle seat ash receiver and more particularly to an ash receiver of simplified construction which can readily be attached to a vehicle seat arm and which can quickly and conveniently be opened and closed for removal of ash material therefrom.

A major problem in vehicle seating is the location, construction and operation of vehicle seat ash receivers. Such receivers must afford an aesthetic appearance complementary to the seat itself. Such ash receivers must also be readily accessible to the seat occupant and yet not so obvious as to be a physical obstruction or visual distraction.

Another common problem in such vehicle seating is the provision of ash receivers which can readily be emptied by maintenance crews and yet not so readily emptied that the seat occupant may inadvertently open the ash receiver to dump the contents.

It is accordingly a principal object of the present invention to provide a simplified vehicle seat ash receiver which forms a hollow terminal end portion of a vehicle seat arm.

Another important object is the provision of such ash receiver which is of simplified construction and which can readily be opened and closed by maintenance personnel for the removal of the contents.

A further object is the provision of a vehicle seat ash receiver constituting a planar continuation of a vehicle seat arm serving in part as an extension of such arm.

Yet another object is the provision of such vehicle seat ash receiver which can firmly be locked in the closed position and yet which can readily be opened for discharge of the contents of the receiver.

Other objects and advantages of the present invention will become apparent as the following description proceeds.

To the accomplishment of the foregoing and related ends, the invention, then, comprises the features hereinafter fully described, the following description and the annexed drawing setting forth in detail a certain illustrative embodiment of the invention, this being indicative, however, of but one of the various ways in which the principles of the invention may be employed.

In said annexed drawing:

FIG. 1 is a fragmentary perspective view of a vehicle seat ash receiver in accordance with the present invention showing the receiver in closed condition mounted on the end of a vehicle seat arm;

FIG. 2 is an exploded view of the ash receiver illustrating the manner in which the receiver is secured to the arm; and FIG. 3 is a vertical section taken through the receiver and illustrating in phantom lines the open or contents discharging position of the receiver.

Referring now to the annexed drawing and more particularly to FIG. 1, there is illustrated a vehicle seat arm 1 which may be supported by strut 2 with the seat being on the side of the arm away from the viewer. The interior of the arm includes a recess 3 for an operating mechanism for controlling the recline of the seat back, such mechanism being located within the arm 1. The arm 1 terminates in a rounded ash receiver container shown generally at 4 which, as illustrated, constitutes a substantial planar continuation of the arm 1.

Referring now additionally to FIG. 2, it will be seen that the ash receiver comprises two basic components, one being the mounting hinge member 5 and the other being the receiver housing 6. The mounting hinge member 5 includes two laterally spaced hinge knuckles 7 and 8 at the top and a peripheral flange 9 extending forwardly from the main plate surface 10 of the hinge member 5 along the sides and bottom. The flange portion 11 along the bottom is inclined downwardly and forwardly and a channel or offset 12 is formed in the hinge plate extending upwardly from the flange portion 11 forming a recess 13 in the back of the hinge member to accommodate a leaf spring 14 which may be secured in place by rivet 15 or other suitable fastener. The mounting hinge member with the spring secured thereto in the recess 13 is secured to the end wall 16 of the arm 1 by a plurality of fasteners shown at 17, such being four in number and passing through the provided apertures 18 in the hinge plate 10.

The spring 14 includes an upstanding planar portion 20 with the lower portion being bent into the forwardly extending shallow S-shape curved portion 21 which terminates in a forwardly and downwardly extending tab 22. The S-shape curved portion 21 includes a rebent or latching portion 23 which cooperates with a shoulder 24 provided by inclined recess 25 in the bottom of the housing 6.

The housing 6 which constitutes the nose or end of the arm 1 includes at its upper end three laterally spaced hinge knuckles shown at 27, 28 and 29 with recesses 30 and 31 being provided therebetween, such recesses accommodating the hinge knuckles 7 and 8 of the mounting hinge 5. A hinge pin 32 is employed hingedly to connect the housing 6 with the mounting hinge 5.

The container includes a snuffer in the form of aperture 34 seen perhaps more clearly in FIG. 3 which includes a top lip 35 downwardly from which extends the interior conical wall 36 opening into the interior of the container. The indentation 25 which provides the latching shoulder 24 also provides a stop shoulder 37 adapted to seat against the edge 38 of the lower inclined portion 11 of the flange 9. Since FIGURE 2 is a perspective view, the inclination of the member 11 is more perceptible in FIGURE 3. In the latched condition as seen in FIG. 3, the shoulders 37 and 24 are tightly confined between the edge 38 and the latching projection 23 of the spring 14. This maintains the ash receiver housing 6 tightly in its closed position preventing any play between the housing and mounting hinge. In such closed position, the peripheral flange 9 will telescope closely within the interior of the housing 6.

As seen more clearly in FIGS. 1 and 2, the ash receiver constitutes a substantially planar continuation of the configuration of the arm 1 which includes a top surface 40, a substantially parallel bottom surface 1 and each side is divided into two surfaces indicated generally at 42 and 43 at a slight angle to each other so that the arm in effect has six different surfaces. The surfaces are also seen in the ash receiver with the side surfaces 44 and 45 being continuations of the side arm surfaces 42 and 43, respectively, and such surfaces of the ash receiver are joined in a shallow fan-shape or conical surface 46. The opposite side of the housing will be substantially the same and the upper and lower surfaces of the housing constituting the substantially planar continuations of the arm upper and lower surfaces 40 and 41 are joined by the curved or circular surface 47. The only projections from the housing surfaces are the snuffer lip 35 on the top and the spring tab 22 on the bottom, the latter being somewhat recessed within the recess 25 in the housing 6. Double line detail of the hinge joint between the surface portions 40 and 44 has been omitted in FIGURE 1; however, the structural elements involved are shown in FIGURE 2. The housing 6 may be a die cast material, which in the closed position of the housing provides a neat single line joint with the end of the arm as indicated at 48.

It can now be seen that the ash receiver can very quickly and easily be mounted on the arm by the four screws or fasteners 17 extending through the apertures 18 in the mounting hinge member 5 with the spring 14 being secured in the recess 13 by the rivet or other suitable fastener 15. In the closed position of the ash receiver housing it will be firmly locked in such closed position and the spring and flange construction associated with the opposite shoulders on the housing will prevent any play. When it is desired to empty the ash receiver it can be swung to the phantom line position 49 seen in FIG. 3 simply by realeasing the spring by applying a prying pressure to the tab 22. This may be done with a screw driver or other implement so that the container can readily be swung to its open or contents discharging position. Once the spring pressure is released, the shoulder 24 will cam over the latching projection 23 of the spring and the container can be closed simply by snapping it shut again with the shoulder camming over the latching projection 23.

It can now be seen that there is provided a vehicle seat ash receiver which constitutes a substantially planar continuation of the arm and is aesthetically a terminal extension of such arm. Moreover, the ash receiver can readily be assembled to the arm and opened and closed for discharge of the contents.

We, therefore, particularly point out and distinctly claim as our invention:

1. A vehicle seat ash receiver comprising the terminal portion of a vehicle seat arm and including a vertically disposed plate-like hinge member secured to the end of such arm, an ash receiver housing, means pivotally connecting said housing to the top of said hinge member for swinging movement between an open and closed position, and spring latch means extending forwardly from the bottom of said hinge member operative releasably to hold said housing in closed position.

2. An ash receiver as set forth in claim 1 including a latching shoulder on said housing cooperating with said spring latch means to hold said housing in closed position, and a stop flange on said hinge member adapted to engage said shoulder in such closed position to eliminate play in such housing in such closed position.

3. An ash receiver as set forth in claim 1 wherein said spring latch means comprises a spring member secured to said hinge member, said spring member including a lower S-shape portion extending below and beneath said hinge member and cooperating with said housing to hold the latter releasably in closed position.

4. An ash receiver as set forth in claim 1 wherein a recess is provided in the back of said hinge member, said spring latch means being secured to said hinge member in said recess to provide a flush surface adjacent the end of such vehicle seat arm.

5. An ash receiver as set forth in claim 1 including a peripheral flange extending forwardly of said hinge member, said housing closely telescoping over said flange in its closed position and contacting the end of such vehicle seat arm to provide direct line contact between such vehicle seat arm and said housing.

6. An ash receiver as set forth in claim 1 wherein the exterior surfaces of said housing comprise surface continuations of said arm, the top and bottom surfaces of said housing being joined by a curved exterior surface, there being a snuffer opening for said housing in the top thereof adjacent such curved surface.

References Cited

UNITED STATES PATENTS

| | | | |
|---|---|---|---|
| 1,892,046 | 12/1932 | Fairlie | 232—43.1 |
| 2,000,916 | 5/1935 | Bloom | 297—194 X |
| 2,181,275 | 11/1939 | Kaner | 131—242 |
| 2,221,959 | 11/1940 | Visser | 131—235 |
| 2,270,914 | 1/1942 | Williams. | |
| 2,449,965 | 9/1948 | Bell | 297—194 X |
| 2,726,035 | 12/1955 | Meissner | 232—43.1 |
| 2,736,320 | 2/1956 | Roberts | 131—241 X |

FOREIGN PATENTS

| | | |
|---|---|---|
| 1,190,246 | 3/1959 | France. |
| 856 | 1903 | Great Britain. |
| 629,068 | 9/1949 | Great Britain. |

JOSEPH S. REICH, Primary Examiner

U.S. Cl. X.R.

131—241; 206—19.5; 232—43.1; 297—194